United States Patent [19]
Travis et al.

[11] Patent Number: 5,422,999
[45] Date of Patent: Jun. 6, 1995

[54] INFORMATION OBJECT TRANSPORT SYSTEM

[75] Inventors: Robert L. Travis, Concord, Mass.; Martin L. Jack, Merrimack, N.H.; William R. Laurune, Maple Valley, Wash.; Nigel Norris, Reading, England

[73] Assignee: Digital Equipment Corporation, Maynard, Mass.

[21] Appl. No.: 368,681

[22] Filed: Jun. 19, 1989

[51] Int. Cl.⁶ .......................................... H04Q 11/04
[52] U.S. Cl. ...................................... 395/200; 370/60; 370/94.1
[58] Field of Search .................. 340/825.07; 364/131, 364/132, 138, 200, 900; 370/60, 94.1, 109; 395/200

[56] References Cited

U.S. PATENT DOCUMENTS

| Re. 31,182 | 3/1983 | Crager et al. | 370/94.1 X |
|---|---|---|---|
| 3,444,521 | 5/1969 | Breese | 340/825.07 |
| 4,058,672 | 11/1977 | Crager et al. | 370/94.1 X |
| 4,058,838 | 11/1977 | Crager et al. | 370/60 X |
| 4,517,637 | 5/1985 | Cassell | 364/138 |
| 4,622,633 | 11/1986 | Ceccon et al. | 264/200 |
| 4,631,664 | 12/1986 | Bachmann | 364/200 |
| 4,751,740 | 6/1988 | Wright | 382/1 |
| 4,791,550 | 12/1988 | Stevenson et al. | 364/200 |
| 4,870,590 | 9/1989 | Kawata et al. | 364/131 X |
| 4,943,932 | 6/1990 | Lark et al. | 364/513 |

OTHER PUBLICATIONS

Stephen Mallinson, "IBM Communications—Architectures and Directions," *Proceedings of the Int'l Conf. on Networking Technology and Architectures,* London, Jun. 1988 pp. 49–60.

Primary Examiner—Edward R. Cosimano
Attorney, Agent, or Firm—Arnold, White & Durkee

[57] ABSTRACT

An information object transport system for enabling nodes to transmit objects a digital data processing system. Each node includes an object store for storing a plurality of objects, at least one of the objects including at least one external reference identifying another object. An information object transport arrangement responsive to receipt of a command identifying an object in the object store performs a packing operation to generate a message comprising the identified object and other objects identified by an external reference of the identified object. After generating a message, the node transmits it to another node in the digital data processing system. Upon receiving a message, an external references resolution portion selects an object in a message and iteratively processes external references in the selected object to identify other objects in the message. The external reference resolution portion enables the object storing portion to store objects identified thereby.

24 Claims, 7 Drawing Sheets

INFORMATION OBJECT TRANSPORT SYSTEM

FIELD OF THE INVENTION

The invention relates generally to the field of digital data processing systems, and more particularly to arrangements for transferring information objects among various processing elements in digital data processing systems.

BACKGROUND OF THE INVENTION

As small and medium sized computer systems are becoming less expensive and more powerful, a number of them are being interconnected to form networks to ensure that a number of different types of services are available at any time to users having diverse processing needs, and also to facilitate communications among the various computer system users connected to the network. In many applications, for example, in networked mail applications, it is necessary to send data, in the form of messages, from a user operating one computer on the network, to another user operating another computer, both computers being nodes on the network. A message may contain only a small amount of data, or alternatively, it may contain large amounts, representing data generated by other applications processed by each computer.

SUMMARY OF THE INVENTION

The invention provides a new and improved data transport system for transferring data in a digital data processing system.

In brief summary, the new data transport system enables nodes to transmit data, represented in the form of objects, to other nodes in a digital data processing system. Each node includes an object store for storing a plurality of objects, at least one of the objects including at least one external reference identifying another object. An information object transport arrangement responsive to receipt of a command identifying an object in the object store performs a packing operation to generate a message comprising the identified object and other objects identified by an external reference of the identified object. After generating a message, the node transmits it to another node in the digital data processing system. Upon receiving a message, an external references resolution portion selects an object in a message and iteratively processes external references in the selected object to identify other objects in the message. The external reference resolution portion enables the object storing portion to store objects identified thereby.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3A-1 through 3B-2 are flow diagrams depicting the operations of the information object transport system in connection with transporting an information object as depicted in FIG. 2.

DETAILED DESCRIPTION OF AN ILLUSTRATIVE EMBODIMENT

Figure 1:
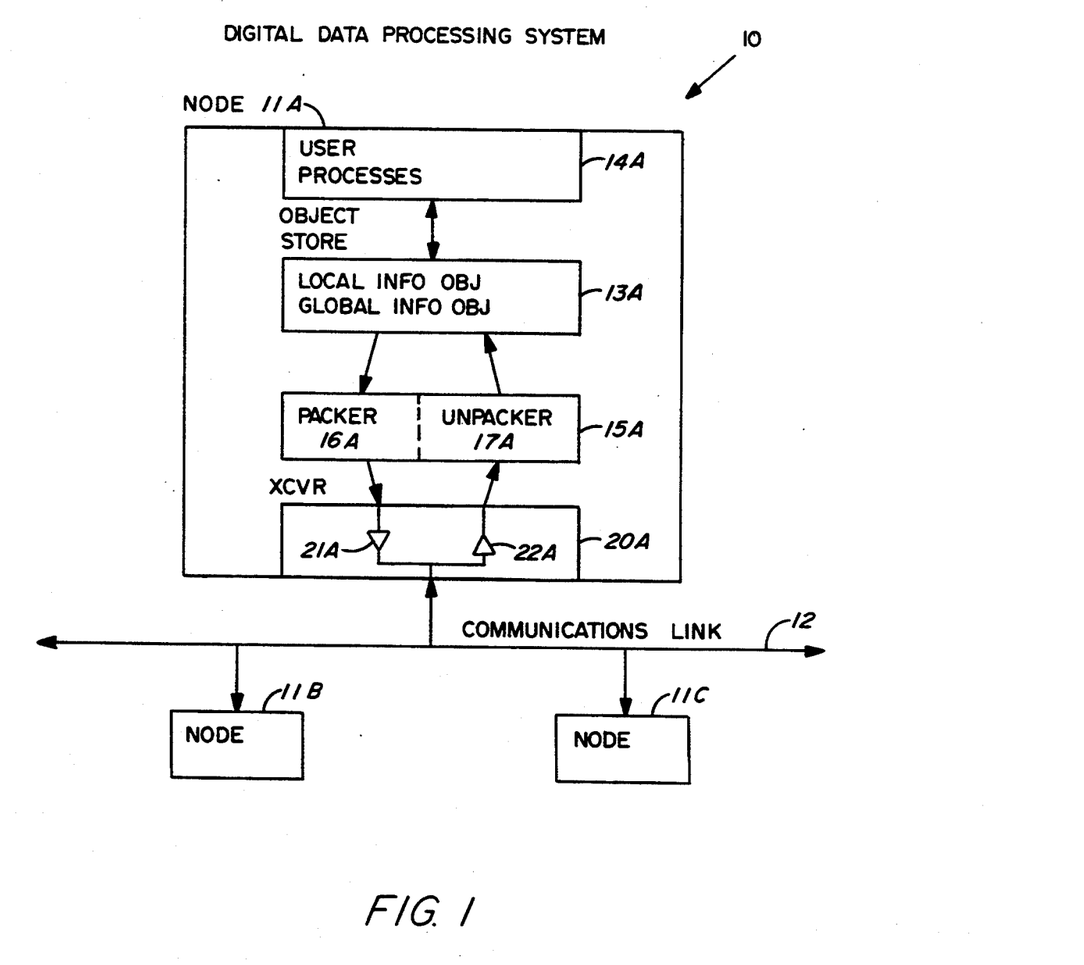
FIG. 1 is a functional block diagram of a digital data processing system including an information object transport system in accordance with the invention.

FIG. 1 depicts a functional block diagram of a digital data processing system 10 including an information object transport system in accordance with the invention. With reference to FIG. 1, the digital data processing system 10 includes a plurality of nodes 11A through 11C (generally identified by reference numeral 11) which transmit messages over a communications link 12, thereby facilitating transfer of data and other information among the various nodes 11.

The structures of the nodes 11 are similar, and so the structure of only node 11A is shown in detail in FIG. 1. In particular, the node 11A includes an object store 13A (generally identified by reference numeral 13) which stores data and other information, such as programs, in the form of information objects. The detailed structure of an illustrative information object is described below in connection with FIG. 2A. The information objects in object store 13A are processed by user processes 14A. In one specific embodiment, an information object generally comprises a set of data or other information which is identified, processed and otherwise used by, for example, user processes 14A (generally identified by reference numeral 14), as a unit. An information object may comprise, for example, the contents of an entire file which may be stored on disk or other storage medium, or a record or other named portion of a file. Each information object has an associated name by which it is identified in the node 11A.

Some information objects may be global information objects, that is, information objects whose names or other identifications are unique across the system 10 and which may be accessed by any user process 14 in any node in the system by reference to the same name or identification. A global information object may be replicated in the various nodes 11, so that the object store in each node 11 includes a copy of the global information objects. Alternatively, a global information object may be resident on a single node 11, and the other nodes may be able to retrieve a copy of it from the node on which it resides by reference to the name of the global information object. Other information objects are local information objects, and may be accessed by name by user processes 14, only on the node 11 in which the local information object resides.

The object store 13A of node 11A is also accessible by an information object transport system 15A, comprising a packer 16A and an unpacker 17A. The packer 16A, on receiving a transfer request from a user process 14A, retrieves an information object from object store 13A, and performs a packing operation described below to generate a transport object, which is described in detail below in connection with FIG. 2B, which it couples to a transceiver 20A, and in particular, a transmitter 21A. The transmitter 21A transmits the transport object, which it receives from the packer 16A, as a message over the communications link 12. As described below in connection with FIG. 2A and 2B, the information object identified by the user process 14 may identify and incorporate by reference other information objects in the object store. 13A; accordingly, performing the packing operation and generating the transport object to be transmitted, the packer 16A includes, along with the object identified by the user process 14, the local information objects referenced by the information object identified by the user process 14A along with the information object that was identified by the user process. The operations performed by the packer 16A in this connection are described below in connection with FIGS. 3A-1 and 3A-2.

Figure 3A:
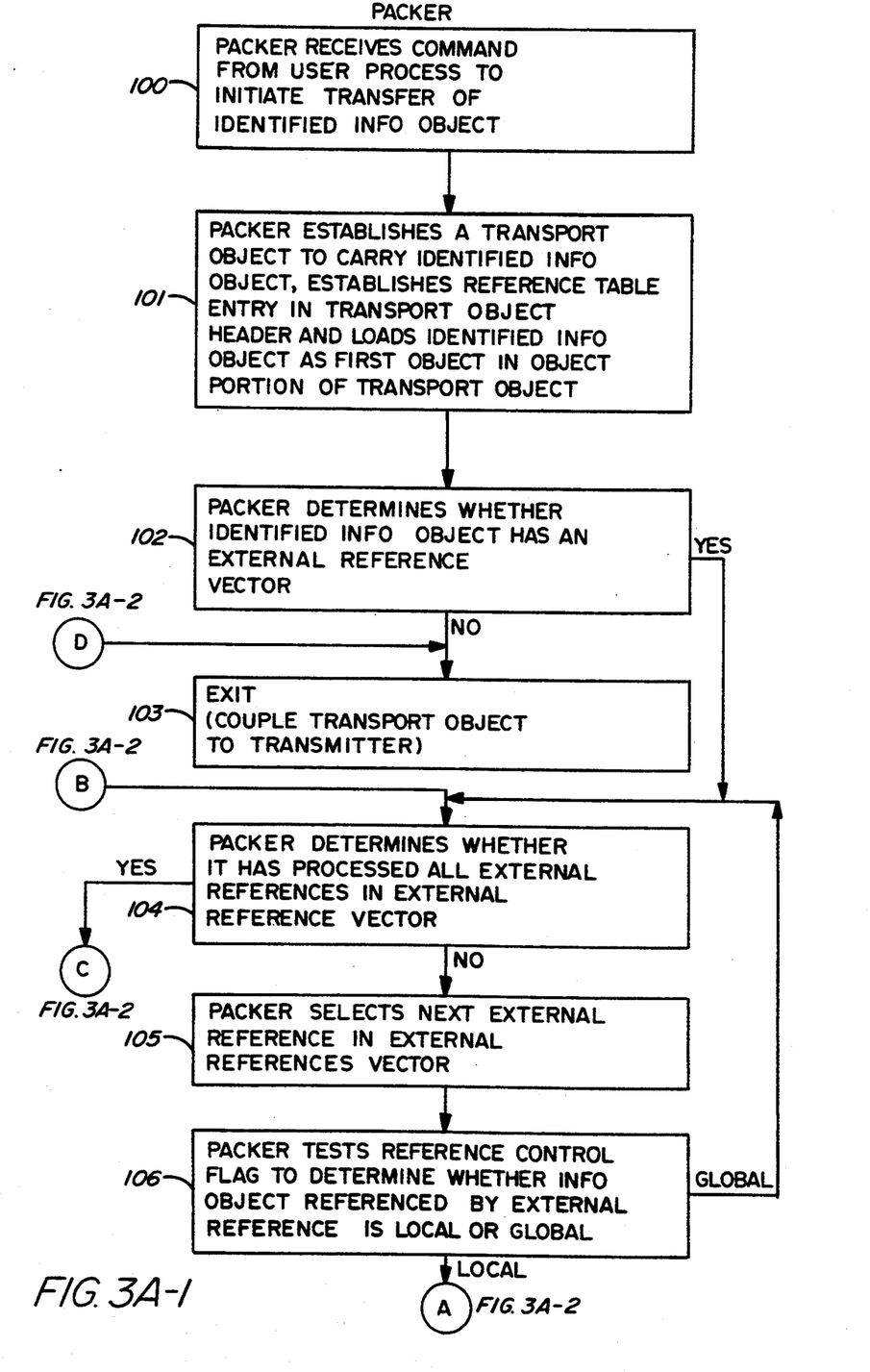
Figure 3A:
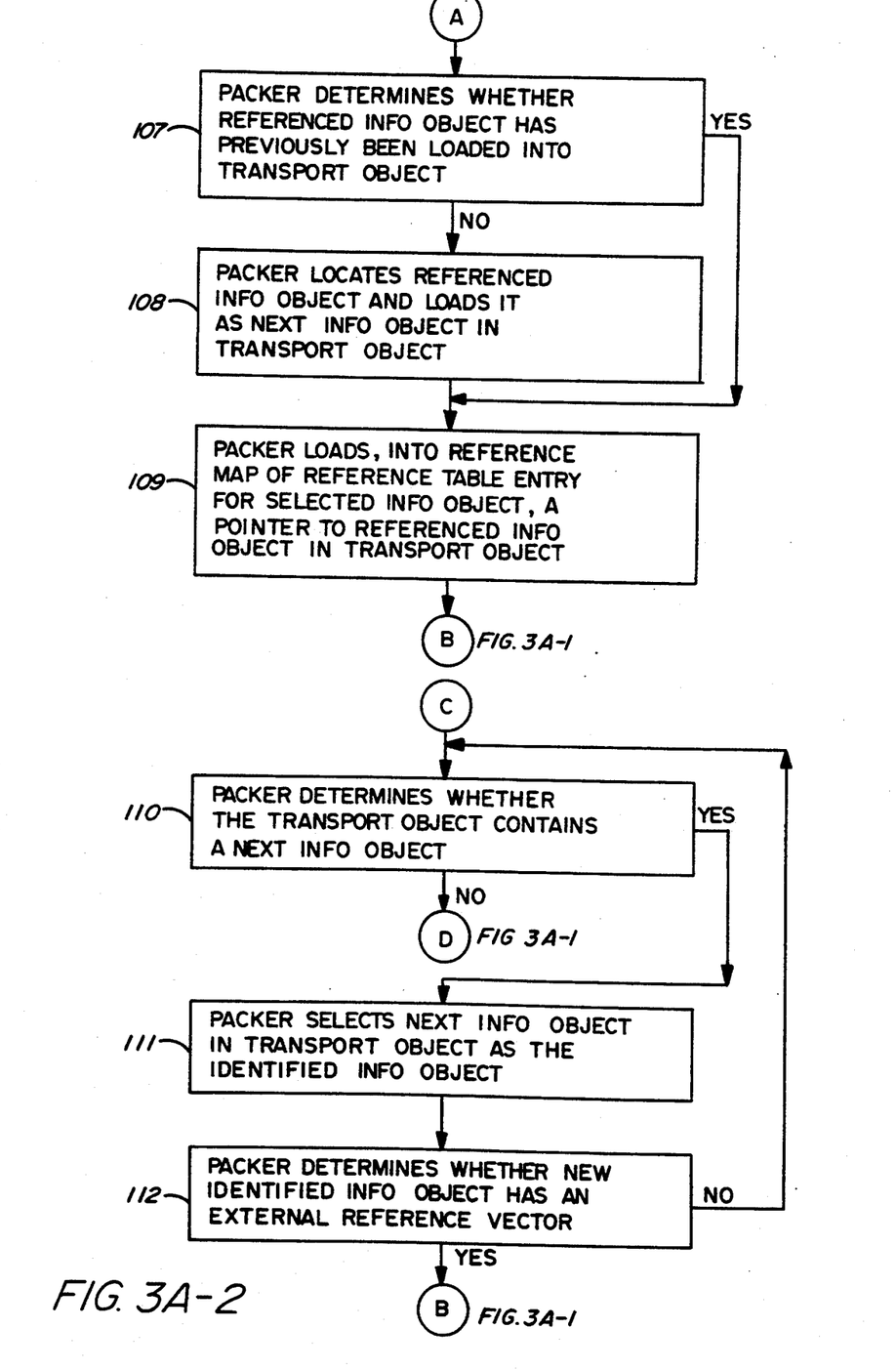
Figure 3B:
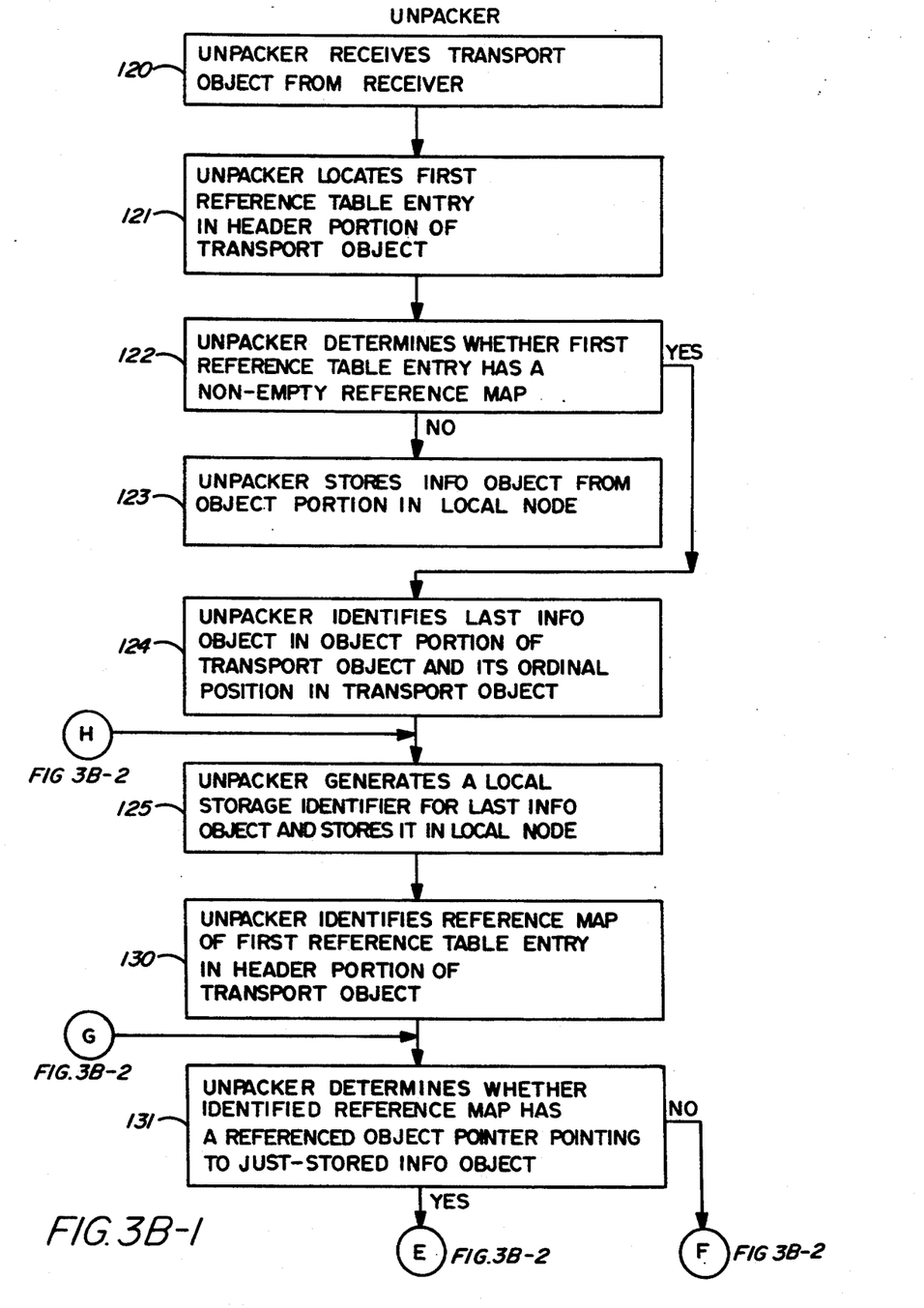
Figure 3B:
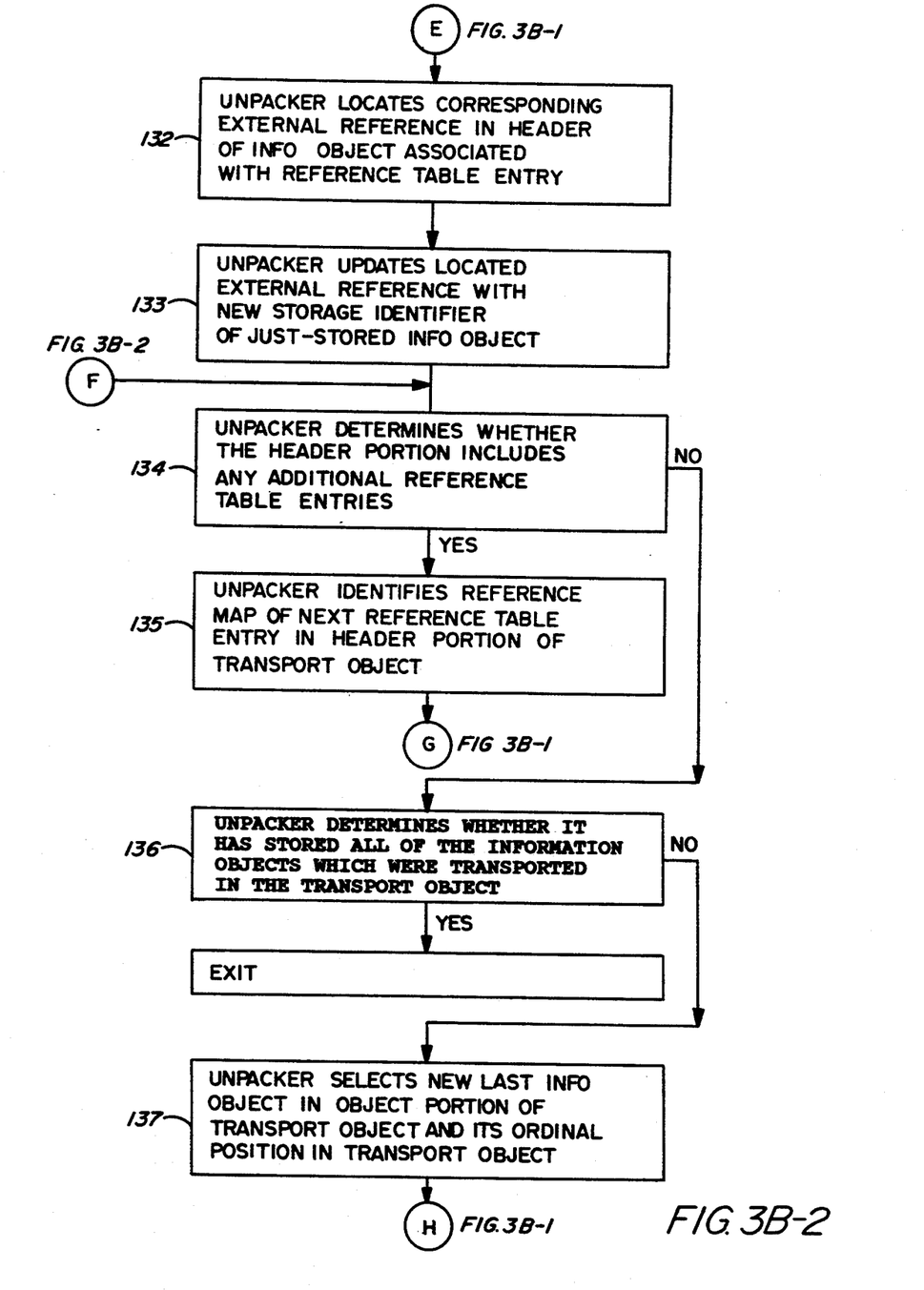

As noted above, the transceiver 20A also includes a receiver 22A which receives messages from the communications link 12, which it couples to an unpacker 17A in the information object transport system 15A. The unpacker 17A obtains a transport object from the received message and separates it into various distinct information objects. In that connection, the unpacker 17A establishes any required references among the information objects to indicate the incorporations by reference in the transmitting node 11. In addition, the unpacker loads the various information objects in the object store 13A. In this operation, which is described below in greater detail in connection with FIGS. 3B-1 and 3B-2, the unpacker 17A separates the individual information objects, which had been packed together by the packer 16 of the node 11 which had originated the message.

Figure 2A:
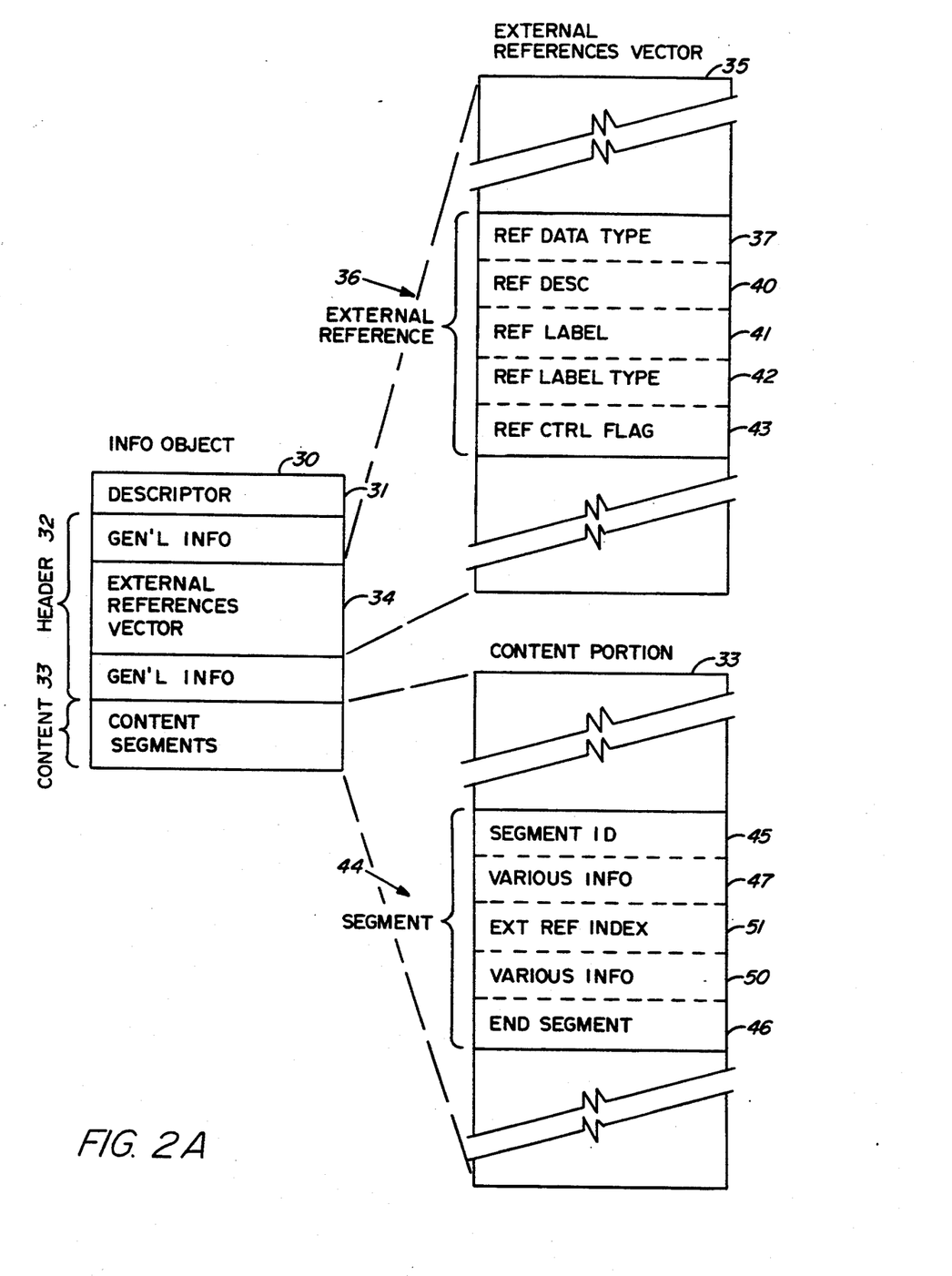
FIG. 2A is a diagram of an information object transported by the information object transport system.

With this background, following a description of the structure of an information object in connection with FIG. 2A and a transport object in connection with FIG. 2B, the details of operation of a packer 16A and an unpacker 17A will be described in connection with FIGS. 3A-1 through 3B-2. With reference initially to FIG. 2A, an information object 30 includes three primary portions, including a descriptor portion 31, a header portion 32 and a content portion 33. The descriptor portion 31 includes a plurality of fields, including fields for such information as the identification of the computer program or other product that generated the information object 30. The header portion 32 also includes a plurality of fields, including fields for information such as the information object's title and author, if any, and the date on which the information object was created or last modified.

In addition, if the information object 30 incorporates other information objects by reference, the header portion 30 includes an external references vector field 34 which stores an external reference vector 35, which is also depicted in FIG. 2. The external reference vector 35 includes one or more external reference entries 36, each identifying an external information object incorporated by reference into the information object 30. Each external reference includes five fields 37 and 40 through 43. A reference data type field 37 and a reference descriptor field 40 store values that identify the data type of the referenced information object. The reference data type field 37 stores a coded value which identifies the data type of the referenced information object, and the reference descriptor field 40 stores a human-readable descriptor of the data type.

The external reference 36 also includes a reference label field 41 and a reference label type field 42 that store values that jointly identify the information object incorporated by reference. In particular, the reference label field 41 stores a value corresponding to the name of the referenced information object. In one embodiment of the digital data processing system 10 (FIG. 1), a node 11A may include an operating system (not shown), and information objects may comprise files, maintained by the operating system, with each file being named according to a naming convention maintained by the operating system. In the same embodiment, the node 11A may also include a record management system, and information objects may comprise records maintained by the record management system, with each record being named according to a naming convention maintained by the record management system. In that embodiment, the information objects identified according to the operating system naming convention may be accessed and manipulated through the operating system, whereas information objects identified according to the record management system naming convention are accessed and manipulated through the record management system. The reference label field 41 stores the file or record name of the referenced information object, and the reference label type field 42 stores a value indicating whether the name is according to the operating system naming convention or the record management system naming convention.

As indicated above, the referenced information object may be a local information object or a global information object. The external reference 36 also includes a reference control field 43 that includes a flag whose condition indicates whether the referenced information object is a local information object or a global information object. As noted above, and described below in connection with FIGS. 3A-1 and 3A-2, if the packer 16 determines that the flag in the reference control field 43 of information object 30 indicates that the referenced information object, that is, the information object identified by the values in reference label field 41 and reference label type field 42, is a local information object, the packer 16A packs the referenced information object with the information object 30 for transmission, by the transmitter 21A, over the communications link 12. In this operation, the packer appends the referenced information object to the information object 30 and modifies the contents of fields 41 and 42 to point to the appended referenced information object. If, on the other hand, the packer 16A determines that the flag in the reference control field 43 of information object 30 indicates that the referenced information object is a global information object, the packer does not pack the referenced information object with the information object 30 for transmission.

On receipt of the packed information object, if the unpacker determines that the flag of an external reference 36 indicates that the referenced information object is a local information object, it uses the pointer in fields 41 and 42 to locate the appended information object, and creates a new local information object therefor for storage in the node's object store 13A. If the unpacker determines that the flag indicates that the reference information object is a global information object, the global information object is not packed with the transmitted information object, and so it performs no operation in connection therewith.

In the information object 30, the data used by the user processes 14 are stored in the content portion 33. In one embodiment, the content portion 33 comprises one or more segments 44, one segment being depicted in FIG. 2A. In that embodiment, the segment 44 are in the form of a plurality of nested segments, with one segment 44 being generally shown in FIG. 2A. The beginning of a segment 44 is identified by a segment identification in a segment identification field 45, and the end is identified by a predetermined code value which thereby defines an end segment field 46. In addition to the segment identification in field 45, the segment 44 may include a fields 47 and 50 which store various information for the hierarchical segment, and may also store other segments, thereby defining the nested hierarchical structure of the content portion 33.

In addition, a segment 44 may include an external reference index field 51. If present in a segment 44, the external reference index field 51 stores a value, essentially comprising an index into the external references vectors 35, which identifies one of the external references 36 in the vector 35. If field 51 is present in a segment 44, the information object identified by the external reference 36 comprises the information for the segment 44. The reference in the external references index field 51 of the segment 44 to the external reference 36 thereby incorporates the information into the information object 30, and specifically into the segment 44.

Figure 2B:
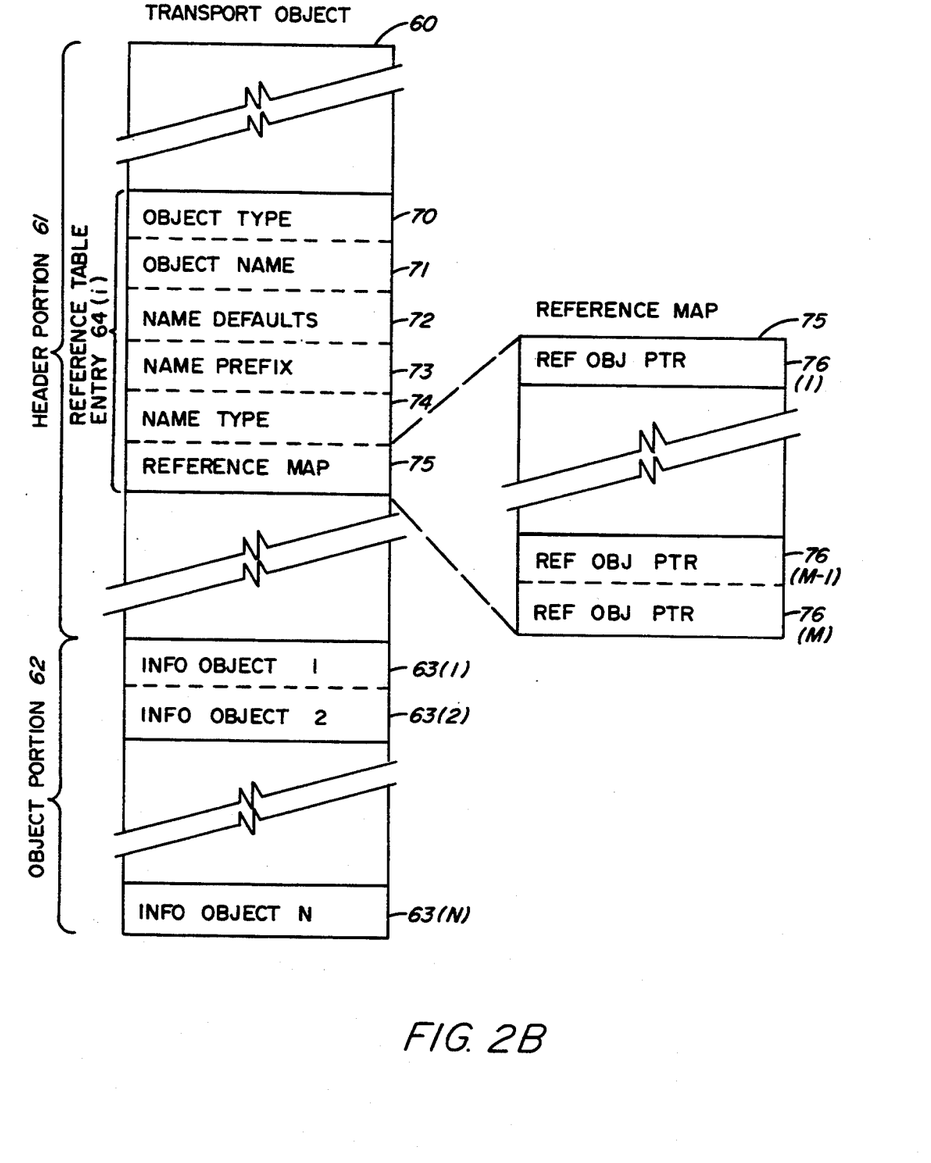
FIG. 2B is a diagram generally depicting the structure of a transport object generated and used by the information object transport system to transport information objects in accordance with the invention.

FIG. 2B depicts the structure of a transport object 60. With reference to FIG. 2B, a transport object 60 includes two portions, namely, a header portion 61 and an object portion 62. The object portion 62 includes one or more slots 63(1) through 63(N) (generally identified by reference numeral 63), and the packer 16, during generation of the transport object 60, loads each of the various information objects 30 to be transferred into a slot 63 in the object portion 62 of the transport object 60. In addition, when it loads an information object into the object portion 60, the packer 16 establishes a corresponding reference table entry 64(i) ("i" being an integer), in the header portion 61.

The reference table entry 64(i) associated with an information object 30 in a slot 63(i) identifies the information object 30 in the slot and also identifies the various local information objects 30 referenced thereby which are included in the transport object 60. More specifically, a reference table entry 64 includes a data type field 70 which provides information as to the information object's data type. The reference table entry 64 also includes four fields 71 through 74 which provide naming information, including an object name field 71, a name defaults field 72, a name prefix field 73 and a name type field 74. The name type field 74 contains information similar to that included in the reference label type field 42, identifying the naming convention used in the name in the other naming fields 71 through 73. If, for example, the name contained in the other fields 71 through 73 is that of a hierarchical storage system, such as that of a disk file in a directory maintained on a node 11, the contents of the name defaults field 72 and name prefix field 73 may contain such information as the sequence of directories and subdirectories defining the file specification for the information object, and the object name field 71 may contain the actual name of the file for the information object.

A reference table entry 64(i) also includes a reference map field 75 which identifies the various information objects in the transport object 60 identified by the information object 30 in the corresponding slot 63(i). More specifically, the reference map 75 includes a plurality of entries 76(1) through 76(M) (generally identified by reference numeral 76) each storing a pointer which identifies the ordinal location, in the transport object 60, of each of the local information objects referenced by the external references vector 35 of the header 32 of the information object 30 in the corresponding slot 63(i). The order of the pointers in the entries 76 of a reference table entry 64(i) is the same as the order of external references 36 in the external references vector 35 of the information object in the associated slot 63(i). That is, in a reference table entry 64(i), the pointer in the first entry 76(1) identifies the slot 63 containing the information object pointed to by the first external reference 36 in the external references vector 35 of the information object in slot 63(i), the pointer in the second entry 76(1) identifies the slot 63 containing the information object pointed to by the second external reference 36 in the external references vector 35 of the information object in slot 63(i), and so on.

With this background, the operations performed by the information object transport system 15A will be described in connection with FIGS. 3A-1 through 3B-2, with the operations of the packer 16 being depicted in FIGS. 3A-1 and 3A-2, and the operations of the unpacker 17A being depicted in FIGS. 3B-1 and 3B-2. With reference initially to FIG. 3A-1, the packer 16A in a node 11 initially receives a command from one of the user process 14A in the same node. 11A to initiate transfer of an information object 30 in the information object store 13A of the same node 11A, the information object to be transferred to another node (11B or 11C) (step 100). In the command, the user process 14A identifies the information object 30 and the destination node (11B or 11C), that is, the node to which the information object 30 is to be transmitted.

Upon receiving the command, the packer 16 initially receives a command from a one of the user processes 14A to initiate a transfer of an information object 30, the identification of which is included with the command (step 100). The packer 16A initially establishes a transport object 60 (FIG. 2B) to carry the information object 30 identified by the command (step 101). In that connection, the packer 16A establishes a reference table entry 64(1) for the identified information object 30, and a slot 63(1) into which it loads the identified information object 30.

Thereafter, the packer 17A determines, by reference to the header 32 of the information object 30 in slot 63(1), whether the information object 30 includes an external references vector 35 in field 34 (step 102). If not, the information object 30 does not incorporate any other information objects by reference, and so the packer 16A may exit (step 103), in the process transferring the transport object, including the single reference table entry 64(1) and slot 63(1) to the transmitter 21A in transceiver 20. Thereafter, the transmitter may build a message, in a conventional manner, from transport object 60 and the identification of the destination node, and couple the message over the communications link 12 to the destination node 11B or 11C.

If the packer 16A determines, in step 102, that the information object 30 has an external references vector 35 in a field 34, it proceeds to a sequence comprising steps 104 through 109 to begin iteratively (1) packing, in successive slots 63 following slot 63(1) in the transport object 60, the local information objects 30 identified by the external references 36 in the external references vector 35 of the information object 30 stored in slot 63(1) as identified by the user process 14A, and (2) updating the entries in the reference map 75 of the reference table entry 64(1) associated with the slot 63(1) containing the information object identified by the command from the user process 14A.

At the beginning of each iteration, the packer 16A first determines whether it has processed all of the external references 36 in the external references vector 35 (step 104). If the packer 16A determines in step 104 that it has not processed all of the external references 36 in the external references vector 35, it selects an external reference 36 in the external references vector 35 (step 105). It will be appreciated that, during the first iteration, the packer 16A will select the first external reference 36 in the external references vector 35, and subsequent external references, if any, during subsequent iterations. After selecting an external reference 36, the packer 16A tests the reference control flag 43 of the external reference 36 to determine whether the referenced information object is a global information object or a local information object (step 106). As described above, if the referenced information object is a global information object, the packer 16A does not load it into a slot 63 in the transport object 60, but instead, the packer 16A loads a null value in the corresponding entry 76 of the reference map 75, to thereby indicate that it is not included in a slot 63 in the transport object 60. If the referenced information object is a global information object, the packer 16A returns to step 104 to select the next external reference 36 in the external references vector 35.

If, in step 106, the packer 16A determines that the reference control flag 43 of the selected external reference 36 indicates that the information object referenced thereby is a local information object, it sequences to step 107. In step 107, the packer 16A determines whether the referenced local information object has previously been loaded into the transport object. In this operation, the packer 16A may maintain a table (not shown), external to the transport object 60, listing the local information objects that it has previously loaded into the transport object, which also identifies the ordinal locations of the respective local information objects in the transport object 60, which it may search to determine whether the referenced object has previously been loaded into the transport object 60. Alternatively, packer 16A may search through the previously-established reference table entries 64 of the header portion 61 of the transport object 60 to determine whether the referenced local information object has been previously loaded into the transport object.

If the packer 16 determines, in step 107, that the referenced local information object has not been loaded into the transport object 60, it sequences to step 108 to locate it in the node's information object store 13A, establish a new slot 63 in the object portion 62 of the transport object 60, and load the just-located referenced local information object 30 into the just-created slot 63 in the transport object 60. Contemporaneously, the packer 16A establishes a reference table entry 64 for the header portion 61 associated with the newly-created slot 63. Thereafter, the packer 16A sequences to step 109. On the other hand, if the packer determines, in step 107, that it has previously loaded the referenced local information object into the transport object 60, it sequences directly to step 109. In step 109, the packer 16A loads a pointer to the newly-created slot 63 in the entry 76 in the reference map 75 of the reference table entry 64(1), which, as noted above, is associated with the slot 63(1) containing the information object to be transferred, as identified in the command from the user process 14A. Thereafter, the packer 16A returns to step 104 to perform steps 104 through 109 in connection with next external reference 36 in the external references vector 35.

It will be appreciated that the information objects referenced by the information object identified by the command from a user process 14A may also contain external references, similar to those in information object 30, some of which may constitute references to local information objects. The packer 16A also loads these secondarily-referenced information objects into the transport object 60, in the same manner as described above in connection with steps 104 through 109.

More specifically, if, in step 104, the packer 16A determines that it has processed all of the external references 36 in the external references vector 35 of the information object 30 identified by the command from the user process 14A, it proceeds to a sequence, comprising steps 110 and 111, to initiate processing of the secondarily-referenced information objects 30. In step 110, the packer 16A determines whether the transport object 60 contains an information object 30 in a slot 63 following the slot 63 for the information object 30 it was just processing. If not, it has completed building the transport object 60, and so it sequences to step 103 to transfer the transport object 60 to the transmitter 21A. On the other hand, if the packer determines, in step 110, that the transport object 60 contains a subsequent slot 63, it selects that information object as a new "identified" information object (step 111).

If the packer 16A determines that new "identified" information object includes an external references vector 35 (step 112), it returns to step 104 to process the external references 36 therein as described above. On the other hand, if the packer determines in step 112 that it does not include an external references vector, it returns to step 110. At some point, the packer 16 will determine, in step 110, that the transport object 60 does not include any additional information objects 30, at which point it has completed the transport object 60. At that point, it sequences to step 103 to transfer the completed transport object 60 to the transmitter 21A, which constructs a message therefrom for transmission to the node or nodes 11B, or 11C intended to receive it.

The operations performed by the unpacker 17A, depicted in FIGS. 3B-1 and 3B-2, are essentially the converse of those performed by the packer 16A. With reference to FIG. 3B-1, the unpacker 17A in a destination node 11 initially receives a message, including a transport object 60 from the node's receiver 22A (step 120). Upon receiving the transport object 60 the unpacker 17A initially locates the first reference table entry 64(1) of the header portion 61 and determines, by reference to the reference map 75 of the first reference table entry 64 in the header portion 61, whether the received transport object 60 includes only a single information object 30, which was identified in the user process command in the transmitting node 11B or 11C that initiated the transfer. In that operation, the unpacker 17A locates the first reference table entry 64(1) in the header portion 61 of the received transport object (step 121) and determines whether that entry 64(1) has a non-empty reference map 75 (step 122). Otherwise stated, in step 122 the unpacker 17A determines whether the reference map 75 of the first reference table entry 64(1) includes at least one entry 76. If the unpacker 17A determines, in step 122 that the first reference table entry 64(1) has a reference map that is empty, it includes an information object 30 only in the first slot 63(1), and so it sequences to step 123 to store that information object 30 in the object store 13A in the receiving node 11A.

If the unpacker 17A determines, in step 122, that the first reference table entry 64(1) has a reference map 75 that is not empty, it sequences to step 134 to begin unpacking the various information objects in the transport object 60. In this operation, the unpacker 17A, beginning with the information object 30 in the last slot 63(N), identifies the information object and its ordinal position (that is, its slot number) in the object portion 62 and stores it in the node 11A. Thereafter, the unpacker 17A searches through the reference maps 75 in the reference table entries 64 to identify the various information objects 30 in the other slots 63(1) through 63(N-1) which reference the just-stored information object 30, and update the external references 36 in their external reference vectors 35 referencing the just-stored information object 30. The unpacker 17A iteratively performs these operations in connection with each of the information objects in the slots 63 from the last slot 63(N) to the first slot 63( 1 ).

More specifically, in step 124 the unpacker 17A initially identifies the information object 30 in the last slot 63(N) of the object portion 62 of the transport object 60, and also identifies its ordinal position in the transport object 60. In this case, the ordinal position identifies its location in the transport object 60, which is the value "N." The unpacker 17A then generates a local storage identifier, or name, for the information object and stores it in the local node 11A (step 125). At that point, the unpacker 17A may also purge the last reference table entry 64(N) since it is not needed for further operations.

Thereafter, the unpacker 17A iteratively performs a series of operations defined by steps 130 through 135 to iteratively use the reference maps 75 of the sequential reference table entries 64 in the header portion 61 to identify the information objects 30, in the other slots 63(1) through 63(N-1) which reference the information object previously in slot 63(N). The unpacker 17A initially identifies the reference map 75 of the first reference table entry 64(1) in the header portion 61 of the transport object 60 (step 130). The unpacker 17A then searches through the various entries 76 in the reference map 75 to determine whether any contain the value "N" (step 131).

If the information object 30 does reference the information object previously in slot 63(N) (step 131), the external reference 36 in the same ordinal position in the external references vector 35 as the entry 76 in the reference map 75 defines the reference to the referenced information object. Accordingly, the unpacker 17A locates the that external reference 36 (step 132), that is, the one in the same ordinal position in the external references vector 35 as the entry 76 in the reference map 75, and updates that external reference 36, (step 133), specifically, the contents of reference label field 41 (FIG. 2A) with a storage identifier identifying the referenced information object 30, that is, the information object that was stored in step 125.

If the unpacker 17A determines, in step 131, that the reference map 75 does not reference the information object that was stored in step 125, or after updating the reference map in step 133, it sequences to step 134 to determine whether the header portion 61 includes any additional reference table entries 64. If so, it identifies the reference map 75 of the next reference table entry 64 in the header portion 61 of the transport object 60 and returns to step 13 1 to determine if it contains a reference to the information object 30 that was in the last slot 63(N) of the transport object 60 (step 135). The unpacker 17 iteratively performs steps 131 through 135 to determine whether the reference maps 75 in any of the other reference table entries 64(2) through 64(N-1) reference the information object that was stored in slot 63(N).

While performing step 134 in connection with the last reference table entry 64 in the header portion 61, the unpacker 17A will determine that the header portion 61 does not include any additional reference table entries. At that point, the unpacker 17 will sequence to step 136 to determine whether it has stored all of the information objects 30 which were transported in the transport object 60. If not, the unpacker 17A selects a new last information object 30, that is, the information object in slot 63(N—1) (step 137), and performs steps 125, to store the information object 30 in node 11A, and steps 130 through 135 to update the various external references 36 in the external references vectors 35 of the other information objects 30 still in the transport object 60. The unpacker 17A thus iteratively performs the operations identified in steps 125 and 130 through 135 in connection with the information objects 30 in each of the slots 63 from the last slot 63(N) to the first slot 63(1) in the object portion 62 of the transport object 60. Upon reaching the first slot 63( 1 ) in the transport object 60, the unpacker 17A will, upon returning to step 136, then determine that it has stored all of the information objects which were transported in the transport object. In other words, at this point the transport object does not include any additional objects, and the unpacker 17A will exit.

The information object transport system 15 thus facilitates communications among nodes 11A, 11B and 11C in a distributed digital data processing system. It will be appreciated that the information object transport system may also be used to facilitate communication among processes processed by a single computer, by packing one or more information objects 30 into a single transport object 60 for transmission from one process to another, and unpacking the information objects for use by the other process. In that case, the communications link 12 may comprise any interprocess communication mechanism, such as an interprocess call operation.

Further, it will be appreciated that, placing references to all of the external information objects in a vector 35, located in a predetermined location in the object's header 32, simplifies location of the external references in the information object 30. The external reference indexes, such as in field 51, in the various segments 45 may be distributed throughout the information object 30, and so if the vector 35 were not provided the packer 16A might otherwise have to search through the information object to locate all of the indexes that an information object might contain.

In addition, if multiple segments in an information object 30 require referencing the same external information object, that can be accommodated by having the indexes 51 reference the same external reference 36 in the vector 35. If the information object did not include a vector 35, it would be desirable for the packer 16A, as it appended each information object, to maintain a record of the identifications of the appended information objects so that it would not append the same information object twice. This could cause the unpacker 17A to unpack the message and generate multiple copies of the same information object, which in turn could result in problems of maintaining consistency among the various copies.

Finally, while the information object 30 has been described as including a content portion 33 organized in a plurality of hierarchical segments 44, the information object transport system 15A may be used in connection with information object whose content portions having a plurality of diverse organizations.

It will be appreciated that the various portions described above may all comprise special-purpose apparatus, or they may comprise computer programs executed by a general purpose computer.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A node for use in a digital data processing system, said node comprising:
   A. an object store including a data storage medium for storing a plurality of objects, at least one of the objects including at least one external reference identifying another object; and
   B. information object transport means responsive to receipt of a command identifying an object in the object store for performing a packing operation to generate a message comprising the identified object and other objects identified by an external reference of the identified object,
   wherein the information object transport means comprises:
      (a.) object retrieval means for retrieving from the object store the object identified by the command;
      (b.) external references processing means for iteratively processing external references in the object retrieved by the object retrieval means, and for enabling the object retrieval means to retrieve, from the object store, objects identified by the external references; and
      (c.) message generation means for generating a message including each object retrieved by the object retrieval means, and for modifying external references in the objects in the message to point to respective objects in the message.

2. A node as defined in claim 1 wherein the external references processing means includes means for recursively processing external references in the objects retrieved by the object retrieval means.

3. A node as defined in claim 1 further comprising a transmitter for transmitting over a communications link messages generated by the information object transport means.

4. A node as defined in claim 1 further including external reference detector means for inspecting each object retrieved by the object retrieval means to determine whether said each object includes any external references and to disable the external references processing means when said each object does not include any external references.

5. A node as defined in claim 4 wherein any external references of said each object are maintained in an external references vector in a predetermined location in said each object, and the external references detector means includes means for determining whether said, each object includes an external references vector.

6. A node as defined in claim 1 wherein the information object transport means further includes unpacker means for identifying various objects included in a message and storing the various objects in the object store.

7. A node as defined in claim 6 further comprising a receiver for receiving messages over a communications link for unpacking by the unpacker means of the information object transport means.

8. A node as defined in claim 1 wherein each external reference in the objects retrieved by the object retrieval means includes a reference control flag, and said external references processing means includes control flag detector means for inspecting the reference control flag of said each external reference for selectively controlling retrieval of an object identified by said each external reference.

9. A node as defined in claim 8 wherein said control flag detector means selectively enables the object retrieval means in response to the reference control flag.

10. A node as defined in claim 9 wherein any external references of each object retrieved by the object retrieval means are maintained in an external references vector in a predetermined location in said each object, and the external references processing means further includes external references selector means for iteratively selecting sequential external references in the external references vector.

11. A node as defined in claim 1 wherein the information object transport means further comprises:
   A. an object storing means for storing an object in the object store; and
   B. an external references resolution means for selecting an object in another message and iteratively processing external references in the selected object to identify additional objects in said another message, and enabling the object storing means to store said additional objects.

12. A node as defined in claim 11 wherein said additional objects identified by the external references resolution means include additional external references, and the external references resolution means includes means for using the additional external references to enable the object storing means.

13. A node as defined in claim 11 wherein the external references resolution means further includes external references detector means for inspecting each of the additional objects to determine whether each of the additional objects includes any external references.

14. A node as defined in claim 13 wherein any external references of each of the additional objects are maintained in an external references vector in a predetermined location in said each of the additional objects, and the external references detector means includes means for determining whether said each of the additional objects includes an external references vector.

15. A node as defined in claim 11 wherein each external reference processed by the external references resolution means includes a reference control flag, and the external references resolution means includes control flag detector means for inspecting the reference control flag of said each external reference for selectively controlling storage of an object identified by said each external reference.

16. A node as defined in claim 15 wherein said control flag detector means selectively enables the object storage means in response to the reference control flag.

17. A node as defined in claim 16 wherein each external reference processed by the references resolution means is maintained in an external references vector, and the external references processing means includes external references selector means for iteratively selecting sequential external references in the external references vector.

18. A method of operating a digital computer for communication of a message including a specified object, said method comprising the steps of:
   a. inspecting the specified object to identify external references in the specified object that refer to other objects;
   b. generating said message by adding to the specified object at least some of said other objects;
   c. modifying external references in the objects in the message to point to respective objects in the message; and
   d. transmitting the message.

19. A method of operating a digital computer at a first node for communication of a message from the first node to a second node in a computer system, said message including a specified object, said method comprising the steps of:
   a. inspecting the specified object to identify external references in the specified object that refer to other objects;
   b. determining whether each of the other objects referred to by the external references is either global to said first and second node or is local to said first node;
   c. generating said message by adding to the specified object the objects that are determined to be local to said first node;
   d. modifying external references in the objects in the message to point to respective objects in the message; and
   e. transmitting the message from the first node to the second node.

20. A method of operating a digital computer at a first node for communication of a message from the first node to a second node in a computer system, said message including a specified object, said method comprising the steps of:
   a. inspecting the specified object to identify external references in the specified object that refer to other objects;
   b. determining whether said each of said other objects is either global to said first node and said second node or is local to said first node;
   c. generating said message by adding to the specified object the objects determined to be local to said first node, but not adding to the specified object the objects that are determined to be global to said first and second node; and
   d. transmitting the message from the first node to the second node.

21. A method of operating a digital computer at a first node for communication of a message from the first node to a second node in a computer system, said message including a specified object, said method comprising the steps of:
   a. inspecting the specified object to identify external references in the specified object that refer to other objects;
   b. determining whether each of said other objects is either global to said first node and said second node or is local to said first node;
   c. inspecting each of said other objects determined to be local to identify any external references in said each of said other objects that refer to additional objects, and when an external reference is found in said each of said other objects that refers to an additional object, determining whether the additional object is either global to said first node and said second node or is local to said first node;
   d. generating said message by adding to the specified object the objects determined to be local; and
   e. transmitting the message from the first node to the second node.

22. A method of operating a digital computer at a first node for communication of a message from the first node to a second node in a computer system, said message including a specified object, said method comprising the steps of:
   a. inspecting the specified object to identify external references in the specified object that refer to other objects;
   b. determining whether each of said other objects is either global to said first node and said second node or is local to said first node;
   c. inspecting each of said other objects determined to be local to identify any external references in said each of said other objects that refer to additional objects, and when an external reference is found in said each of said other objects that refers to an additional object, determining whether the additional object is either global to said first node and said second node or is local to said first node;
   d. generating said message by adding to the specified object the objects determined to be local;
   e. modifying external references in the objects in the message to point to respective objects in the message; and
   f. transmitting the message from the first node to the second node.

23. A digital computer comprising:
   a. object retrieval means for retrieving a specified object from an object store;
   b. iterative processing means for processing external references in the object retrieved by said object retrieval means, and during successive iterations, enabling the object retrieval means to retrieve the objects identified by the external references;
   c. message generating means for generating a message including each retrieved object; and
   d. external reference processing means for modifying external references in the objects in the message to point to respective objects in the message.

24. A digital computer comprising:
   a. object retrieval means for retrieving a specified object from an object store;
   b. first iterative processing means for processing external references in the object retrieved by said object retrieval means, and during successive iterations, enabling the object retrieval means to retrieve the objects identified by the external references;
   c. message generating means for generating a first message including each retrieved object;
   d. external reference processing means for modifying external references in the objects in the first message to point to respective objects in the first message;
   e. object selection means for selecting an object in a second message;

f. second iterative processing means for iteratively processing external references in the object selected by the object selection means, and, during successive iterations, identifying additional objects in the second message identified by the external references in the object selected by the object selection means; and g. object storing means for storing in said object store the object selected by the object selecting means and the additional objects identified by the second iterative processing means.

* * * * *